United States Patent

Kobayashi et al.

[11] Patent Number: 5,903,811
[45] Date of Patent: *May 11, 1999

[54] COMPACT AUTOMATIC DOCUMENT FEEDER WITH COMPACT DOCUMENT REVERSING DEVICE

[75] Inventors: Atsumi Kobayashi; Hidenobu Sugano; Masaki Ohmori; Tetsuya Aiyama, all of Yamanashi, Japan

[73] Assignee: Nisca Corporation, Yamanashi, Japan

[*] Notice: This patent is subject to a terminal disclaimer.

[21] Appl. No.: 08/861,806

[22] Filed: May 22, 1997

Related U.S. Application Data

[63] Continuation of application No. 08/552,084, Nov. 2, 1995, Pat. No. 5,689,793.

[30] Foreign Application Priority Data

Nov. 8, 1994 [JP] Japan .................................. 6-298816

[51] Int. Cl.[6] .................................................. G03G 15/00
[52] U.S. Cl. ........................ 399/367; 358/496; 399/373; 399/374
[58] Field of Search ................................... 399/365, 367, 399/373, 374; 358/496, 498; 355/23, 50

[56] References Cited

U.S. PATENT DOCUMENTS

| 4,419,007 | 12/1983 | Kingsley ............................ 355/23 X |
|---|---|---|
| 4,815,722 | 3/1989 | Sugimoto . |
| 5,339,139 | 8/1994 | Fullerton et al. ...................... 399/203 |
| 5,438,435 | 8/1995 | Lawniczak .............................. 358/496 |
| 5,463,451 | 10/1995 | Acquaviva et al. ................... 355/23 X |
| 5,488,464 | 1/1996 | Wenthe, Jr. et al. ................. 355/23 X |
| 5,689,793 | 11/1997 | Kobayashi et al. ..................... 399/374 |

FOREIGN PATENT DOCUMENTS

| 62-111838 | 5/1987 | Japan . |
|---|---|---|
| 1-220658 | 9/1989 | Japan . |
| 3-63138 | 6/1991 | Japan . |
| 4-115841 | 10/1992 | Japan . |

*Primary Examiner*—William J. Royer
*Attorney, Agent, or Firm*—Kanesaka & Takeuchi

[57] ABSTRACT

A document feeder is formed of a reading section for reading an original document while the original document is being transferred; a transfer roller having a transfer path therearound with an inlet located near the reading section and an exit so that the original document is transferred from the inlet to the exit through the reading section; and first and second rollers pressed against the transfer roller. The first and second rollers are located respectively in upstream and down stream sides of the transfer path relative to the reading section. A guide member is overlapped with the transfer roller at one end so that the original document from the second roller is guided from the one end to the other end.

5 Claims, 17 Drawing Sheets

COMPACT AUTOMATIC DOCUMENT FEEDER WITH COMPACT DOCUMENT REVERSING DEVICE

CROSS REFERENCE TO RELATED APPLICATION

This is a continuation application of Ser. No. 08/552,084 filed on Nov. 2, 1995, now U.S. Pat. No. 5,689,793.

BACKGROUND OF THE INVENTION AND RELATED ART STATEMENT

The present invention relates to a document transferring device for an image forming device, such as an image reading device or an image printing device, and more specifically, to an automatic document supplying device for supplying a plurality of documents stacked on a document tray by separating sheet by sheet to the image forming device, such as the image reading device.

As an example of the document transferring device for the image forming device, there has been known an automatic document supplying device for a book scanner wherein a function for reading a transferring document is added to the book scanner of a type where a stationary document is read. This type of device comprises a document placing table, document separating means disposed on one side over an ejection tray and a scanner main portion, document transferring means, and paper ejecting means, wherein a document transfer path extending to the ejection tray is rotated by 180 degrees on the way thereof, so that the document placing table and the ejection tray are disposed in a vertical relationship. In the conventional device, since the document placing table and the ejection tray are disposed in the vertical relationship, reading of the stationary document and reading of the transferring document can be carried out with a compact structure.

However, in the reading device as described above, the document does not always have an image information on one side thereof, and in many cases, the document has image information on both sides.

The conventional device as described above does not have a mechanism for automatically processing the document with the image information on both sides, and in order to process the both side document, even the automatic document supplying device is not useful, so that there are defects in an operation ability in that the both side document has to be manually reversed whenever one surface side is copied.

The present invention has been developed based on the aforementioned problems of the conventional device, and it is an object of the present invention to provide a document transferring device wherein the document is surely transferred while having the same compact structure as in the conventional device, and furthermore, various supply modes are provided to thereby obtain improved performance.

SUMMARY OF THE INVENTION

The above object is achieved by the following structure.

A document transferring device for an image forming device according to the invention includes a pair of switchback rollers disposed in a switchback path and formed of one pair of rollers for switchback-transferring a document received from a paper outlet of a transfer path; and roller separating means wherein a leading edge of the document reversely transferred from the switchback path is returned to the pair of the switchback rollers through the transfer path, and right before the leading edge adjoins a rear portion of the document at the pair of the switchback rollers, the pair of the switchback rollers is separated. The pair of the switchback rollers can be also used as document ejecting means. Also, on the way of the transfer path, there is provided an image reading portion for allowing an image forming device to read an image information carried by the document, or a printing portion for printing onto a transferring document. Further, on a downstream side of a junction of the transfer path and the switchback path, there is provided register means for aligning the document and setting a timing for feeding the document, and the transferring means is formed of a plurality of wheel shape members with a large diameter disposed in a shaft direction wherein a revolving contact point of a roller paired with the wheel shape member of the large diameter is provided on a periphery of the large diameter wheel shape member.

Incidentally, in the document transferring device for the image forming device according to the present invention, there can be additionally provided, if necessary, separation supply means for separating a plurality of documents placed on the document placing means sheet by sheet and sending the same.

Next, operations of the respective means are explained.

The documents placed on the document placing means are transferred, sheet by sheet, to the transferring means with the transfer path for leading the document toward document pressing means. Then, the document passed through the transfer path is ejected by the paper ejecting means from the paper outlet opened to a back side of the document pressing means. On the one hand, the switchback path is disposed between the document pressing means and the document placing means, and, if necessary, the document is switchback-transferred by the paper ejecting means in the middle of ejecting, and again transferred to the transfer path. Also, the back surface of the document pressing means constitutes a part of the switchback path to thereby miniaturize and simplify the structure.

Further, if necessary, the document is switchback-transferred by the pair of the switchback rollers in the switchback path, and again transferred to the transfer path. Therefore, in case the leading edge of the document reversely transferred from the switchback path passes through the transfer path, again returns to the pair of the switchback rollers, and adjoins the rear portion of the document at the pair of the switchback rollers, since the pair of the switchback rollers is separated from each other, the leading and rear edges of the document are not rubbed each other, and since the pair of switchback rollers is also used as the paper ejecting means, the structure is simplified. Further, the image information carried by the document while being transferred in the transfer path is read by the image reading portion of the image forming device, or printed by the printing portion. Furthermore, in the device where the register means for aligning the document and setting the timing for sending the document is provided on the downstream side of the junction of the transfer path and the switchback path, the timing for transferring the document can be accurate, and a good transferring posture can be maintained.

Also, since the transferring means is formed of the large diameter wheel shape members, a uniform transferring speed can be kept in the transfer path to thereby read the document definitely.

DETAILED DESCRIPTION OF PREFERRED EMBODIMENTS

An embodiment of the present invention is explained with reference to the drawings.

In the present embodiment, as a practical mode of a document transferring device, a structure including an image reading device 10 (hereinafter referred to as a reading device or a main device) as an image forming device and an automatic document supplying device 20 for supplying documents to the reading device is adopted.

Figure 1:
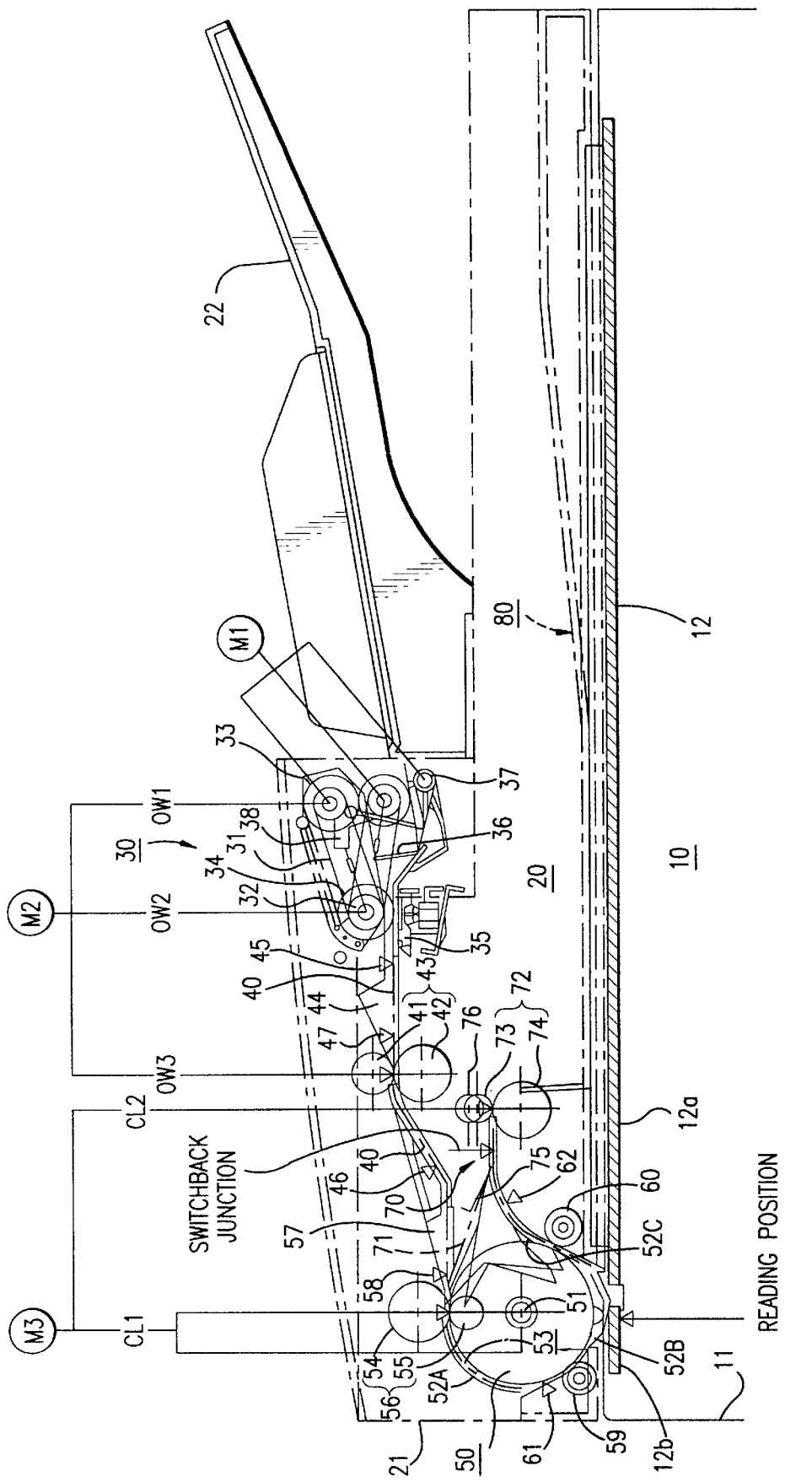
FIG. 1 is a side view of an essential part of an automatic document supplying device (a document transferring device)

The reading device 10, as shown in FIG. 1, includes a frame member 11; a stationary platen 12a with a plane upper surface for placing thereon and reading a fixed document; and a stationary platen 12b disposed adjacent to the stationary platen 12a for reading a moving document.

The stationary platens 12a, 12b are formed of a transparent material, such as glass, and inside the frame member 11, known reading means formed of a moving illuminating device, a moving mirror, a plurality of stationary reflection mirrors and CCD, not shown, for reading image information of the document placed on the upper surfaces of the stationary platens 12a, 12b is stored.

Above the stationary platens 12a, 12b, the automatic document supplying device (also, simply called as a document device) 20 to which the present invention is applied is disposed.

The automatic document supplying device 20 as a whole includes a frame member 21, the respective functional portions sequentially explained hereinafter are disposed in connection with the frame member 21, and the frame member 21 is structured to freely open and close against the stationary platens 12a, 12b by means of a hinge, not shown.

Namely, the document device 20, as shown in FIG. 1, is formed of a document tray 22 as document placing means for placing documents thereon; separating and supplying means for separating, sheet by sheet, and supplying the documents stacked on the document tray 22, such as a paper supplying portion 30; first register means 43 including a pair of rollers 41, 42 disposed in a main path 40 for guiding the document; a rotation roller 50 as transferring means for rotating the supplied document and so that image information is read by the fixed moving illuminating device, the moving mirror and the like at one place; a switchback mechanism 70, which is also used as paper ejecting means, for carrying out a paper ejecting operation to eject the read document and switchbacking the document in the middle of the paper ejecting operation to thereby again supply the document to the rotation roller 50; and an ejection tray 80 for receiving processed documents.

The document tray 22 as the document placing means is attached with a posture gently sloped forward, as shown in FIG. 1, and in the present embodiment, a maximum A3 size of paper can be placed on the tray in a lengthwise direction.

The paper supplying portion 30 includes a feeding roller 33 provided at a forward end of a swing arm 31, a base portion of which is rotatably pivoted to a shaft 32, and at the same time the shaft 32 is provided with a transferring roller 34 for transferring the fed document, and a separation pad 35 for blocking a second paper and the rest.

At an intermediate position between the feeding roller 33 and the transferring roller 34, there is provided a stopper 36 connected to a swing shaft 37 at its base edge to thereby block leading edges of the documents when the documents are placed on the document tray 22. And as shown in FIG. 1, the shaft 32 of the swing arm 31 and the swing shaft 37 of the stopper 36 are connected together to a DC motor M1, and in association with descending of the feeding roller 33, the stopper 36 also descends to thereby open a path. Incidentally, at a position of the stopper 36, there is provided an empty sensor 38 for detecting whether the documents are stored on the document tray 22. Incidentally, the feeding roller 33 is swung up and down by a keep solenoid (not shown) to take an abutting position and a separated position with respect to the documents placed on the document tray 22, and normally, in case the feeding roller 33 moves up and down whenever each document is fed in a mixed-stack condition, taking into consideration that a stack of the documents is liable to collapse by a shock caused by pressing the documents, the feeding roller 33 keeps pressing the documents until all the documents are supplied.

Further, the feeding roller 33, the transferring roller 34 and the first register means 43 described in the following are drivingly coupled with a DC motor M2 through one-way clutches OW1, OW2, and OW3, respectively. Thus, when the DC motor M2 rotates forward, the one-way clutches OW1 and OW2 are in a coupled condition, the feeding roller 33 and the transferring roller 34 rotate in a document transferring direction, and at the same time the first register means 43 is in a stop condition. On the contrary, when the DC motor M2 rotates in reverse, the one-way clutch OW3 is coupled, and the one-way clutches OW1 and OW2 are not coupled.

The main path 40 for sending the document extends forward from the paper supplying portion 30. And, there is provided the first register means 43 formed of a pair of rollers 41, 42 for catching a leading edge of the document transferred to the middle portion of the main path 40, adjusting a posture of the document, and setting a timing for sending the document toward the rotation roller 50. In an immediate front of the first register means 43, there is provided a first register space 44 for allowing the document to be curved and adjusting the posture thereof.

Before the first register space 44, there is provided a size sensor 45 for detecting a size of the document by detecting a leading edge and a rear edge of the document. Also, on the main path 40 passed through the first register means 43, a width sensor 46 for detecting a width of the document is provided.

Incidentally, although the above size sensor 45 cannot detect the size until the leading and rear edges of the document are detected, since the document device 20 is compactly structured, even if the leading edge of the document reaches a reading position described later, the rear edge does not pass the size sensor 45, so that a reading operation may be carried out without recognizing the size of the document, and information supplied to the main device 10 may be delayed. Therefore, in the present embodiment, by means of a controlling device (not shown), the size information of the desired document can be recognized from the width information thereof obtained through the width sensor 46. Although the width information (actually, a length information of the document) of, for example, a B5Y document obtained by the width sensor 46 is the same as that of a B4T document, since a real size information of the B5Y document can be obtained by the size sensor 45 immediately thereafter, the size information obtained through the width sensor 46 is corrected at an early stage.

In a forward portion of the main path 40 after passing the first register means 43, as shown in FIG. 1, the rotation roller 50 as transferring means formed of a wheel shape member having a large diameter is disposed.

Figure 2:
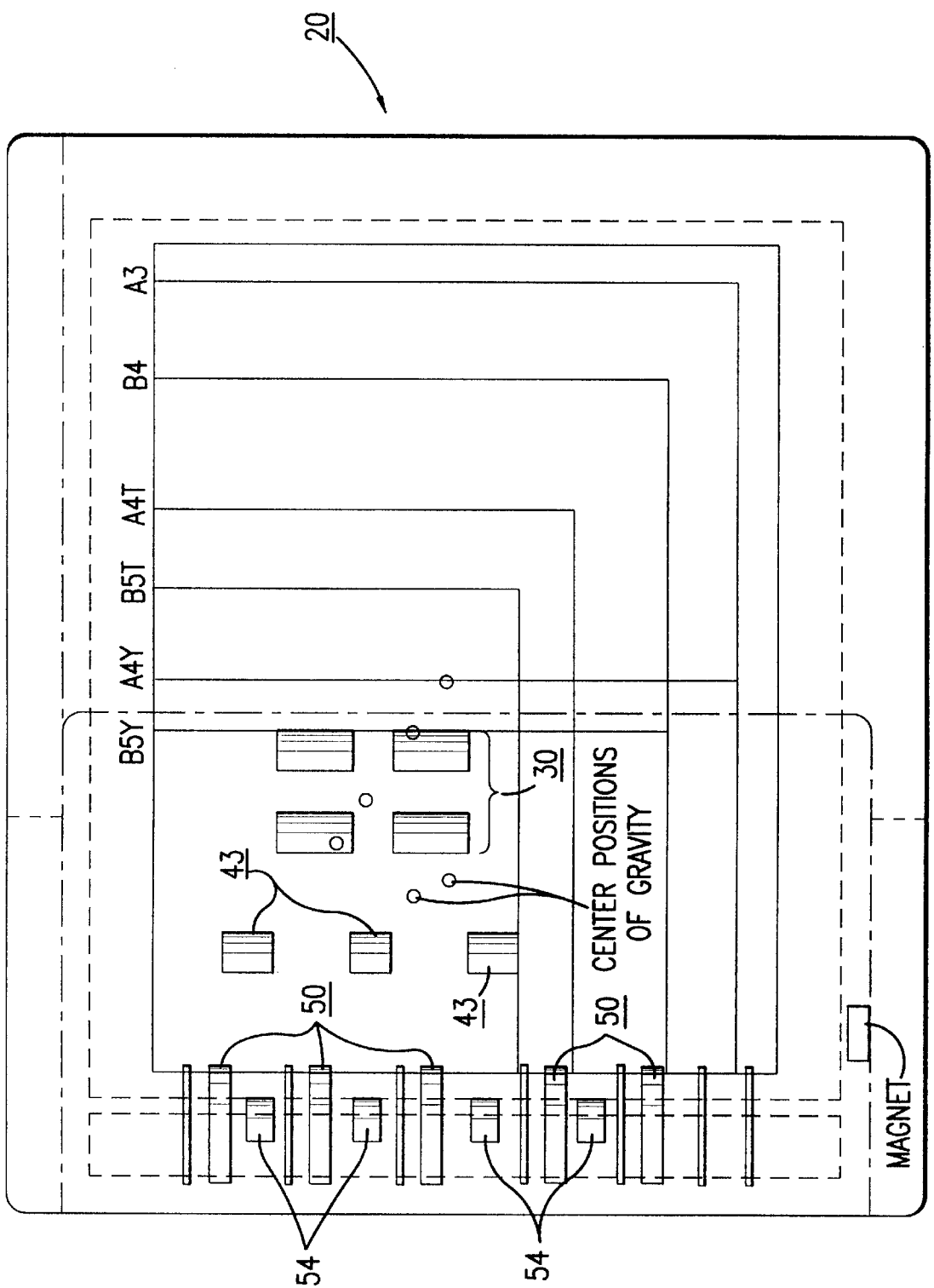
FIG. 2 is a top plan view of the automatic document supplying device (the document transferring device)

The rotation roller 50, as shown in FIG. 2, is an assembly of a plurality of wheel shape rotating members coupled with a platen shaft 51 with a proper space therebetween. Then, guides 52A, 52B, and 52C for guiding the document are disposed to surround the rotation roller 50. Incidentally, these guides 52A, 52B, and 52C form a transfer path 53 together with the rotation roller 50.

In the guide 52A, as shown in FIG. 1, there is provided register means, for example second register means 56, formed of a pair of rollers 54, 55 revolvingly contacting each other. The second register means 56, as shown in FIG. 1, has a revolvingly contacting point of the rollers 54, 55 on a circumference of the rotation roller 50, and as shown in FIG. 2, in the respective intermediate portions of the separated rollers of the rotation roller 50, the plural pairs of rollers 54, 55 are disposed. The above structure enables to surely hold the documents and to set an accurate timing for transferring.

Here, a relationship of the document processed in the present embodiment and an arrangement of the feeding roller 33, the transferring roller 34, the first register means 43, the respective rollers of the rotation roller 50, and the rollers 54, 55 of the second register means 56 are explained hereunder.

In FIG. 2, it is shown that processed documents with standard sizes ranging from B5 to A3 are arranged at right side edges in a transfer direction. In the drawing, T designates a document placed to have a lengthwise direction thereof with respect to the transfer direction, and Y designates a document placed to have a widthwise direction thereof with respect to the transfer direction.

In FIG. 2, center positions of gravity of the respective documents are shown by a small circle. When these center positions of gravity are compared with the respective positions of the rollers including the feeding roller 33 and the rest described above, it is found that the roller 33 and the like are arranged to hold these center positions of gravity or at least to be just above these center positions. Namely, when the roller 33 and the like feed the document, the respective rollers hold the center position of gravity of the document or contact just on the center position of gravity, so that even if the document receives a feeding force, the document is rarely skewed, and a right transferring posture thereof can be maintained.

On an upstream side of the guide 52A over the second register means 56, there is provided a second register space 57 for allowing the leading edge of the document to be held by the pair of rollers 54, 55 of the second register means 56 and correcting the posture of the document by bending the rear portion thereof. Also, just before the second register means 56, a second register sensor 58 is disposed.

At an approximately middle position of the guide 52B, a slit (not shown) is provided to define the reading position, so that the document can be read. Also, at an upstream side of the reading position, as shown in FIG. 1, there is provided a read sensor 61 for detecting the leading edge of the document and sending the information to the main device 10.

The guide 52C, as shown in FIG. 1, also functions as a paper ejecting path as it is, and at a terminal edge thereof, there is provided the paper ejecting means also functioning as a pair of switchback rollers, for example, rollers 73 and 74 constituting a pair 72 of the paper ejecting rollers. Therefore, the pair 72 of the paper ejecting rollers is called as the pair 72 of the paper ejecting rollers when operated in a paper ejecting direction in FIG. 1, and as described later, when operated as the pair of the switchback rollers, the pair 72 of the rollers is called as the pair 72 of the switchback rollers. Also, to the guide 52C, a paper ejecting sensor (hereinafter referred to as a SBHS sensor) 62 for detecting the leading and rear edges of the document is provided; a document transferring pulse number is counted from a time point when the rear edge of the document is detected by the SBHS sensor 62; and the document is transferred by the pulse number enabling the rear edge of the document to reach a switchback junction to thereby standardize a timing for stopping the document when the document is switchback transferred.

Incidentally, pinch rollers 59, 60 for enabling the document to closely contact a platen surface revolvingly contact the rotation roller 50.

At a forward portion of the pair 72 of the paper ejecting rollers, the ejection tray 80 for receiving the processed document is provided. Thus, as shown in FIG. 1, a lower surface of the ejection tray 80 is also used as pressing means for pressing a document manually placed on the stationary platen 12.

As shown in FIG. 1, from the pair 72 of the paper ejecting rollers (the pair of switchback rollers) to the second register space 57, there is provided a switchback path 71 for again supplying the document to the transfer path 53. At a boundary between the switchback path 71 and the guide 52C, there is provided a switching piece 75 to overlap with the rotation roller 50 as a one way valve for preventing the rear edge (the leading edge at the switchback) of the document from returning to a direction of the guide 52C when the switchback of the document is carried out. The switching piece 75 operates as a guide for the switchback path 71. Incidentally, Mylar may be provided in a path at the switchback junction instead of the switching piece 75.

The switchback path 71, the pair 72 of the switchback rollers (switchback rollers 73, 74) and the switching piece 75 constitute the switchback mechanism 70.

Hereinafter, a position where the pair 72 of the switchback (paper rejecting) rollers is disposed is explained.

Firstly, although there is no special restriction for a document with a smaller size processed in the document device 20, sheets of the document are to be a standard type and the smallest size in the transferring direction should be B5Y (Y designates a document placed to have a widthwise direction thereof with respect to the transferring direction; and T in the drawing designates a document placed to have lengthwise direction thereof with respect to the transferring direction) as shown in FIG. 2. Then, the pair 72 of the switchback rollers is disposed such that the document of the B5Y size passes through the switchback path 71 and then the transfer path 53, and the leading edge thereof (the rear edge thereof before the switchback operation is carried out) and the rear edge of the document pass each other approximately at the pair 72 of the switchback rollers. The structure as described above reduces a transferring distance of the document, improves a processing speed, maintains a right transferring posture, and at the same time contributes to miniaturization of the document device 20.

Hereunder, regarding the pair 72 of the switchback rollers (the pair of the paper ejecting rollers), general operations except for specific structure and operation described later are explained.

When the document passes through the transfer path 53 and the leading edge thereof is detected by the SBHS sensor 62, the pair 72 of the paper ejecting rollers starts rotating forward (a direction of sending the document toward the right side in FIG. 1). Then, when the document is ejected as it is, after the rear edge of the document is detected by the SBHS sensor 62, the pair 72 of the paper ejecting rollers stops at a predetermined time T4. On the other hand, in the case of a switchback mode, the pair 72 of the rollers stops once after a predetermined time T5 after the rear edge of the document is detected by the SBHS sensor 62, and then starts rotating reversely. Then, the pair 72 of the rollers stops after a predetermined time T6 after the leading edge (the rear edge hereinbefore) of the document is detected by the second register sensor 58. Thereafter, the pair 72 of the rollers is separated from a pulse motor M3 to freely rotate, and the document is transferred by the second register means 56, the rotation roller 50 and the like.

Incidentally, the second register means 56 and the rotation roller 50 are coupled with the pulse motor M3 through a clutch CL1, and in the same manner the pair 72 of the paper ejecting (switchback) rollers is also coupled with the pulse motor M3 through a clutch CL2.

Next, a characteristic structure of the pair 72 of the switchback rollers is explained.

At this moment, in case the leading edge of the document in the course of being transferred in the switchback mode is detected by the SBHS sensor 62 and the document size information at the time point is larger than B5Y, until the leading edge of the document reaches the pair 72 of the switchback rollers, the switchback rollers 73, 74 for constituting the pair 72 of the switchback rollers are separated from each other. Namely, the roller 73 is moved from a state shown by a solid line to a position shown by a broken line in FIG. 1 by magnetizing a DC solenoid 76 as roller separating means to thereby be moved upward. With the separation of both rollers 73, 74, the leading and rear edges of the document passing each other at the position are smoothly transferred without strongly being rubbed against each other.

Also, the ejection tray 80 has the lower surface functioning as the pressing means for pressing the document placed manually, and at the same time, constitutes a part of the switchback path for holding most of the document at the switchback operation.

The document device 20 performs the normal document transferring operation by means of a controlling device, not shown, and also has a function for obtaining the size information of the document from the aforementioned document's width information. Further, the document device 20 enables the following mode selective controls.

1. One side reading mode (K mode) . . . A document separated from the others and fed from the document tray 22 is transferred to the transfer path 53 through the first register means 43; while being transferred by the rotation roller 50 rotated by the pulse motor M3, an image information of the document is read, and the document is ejected to the ejection tray 80 by the pair 72 of the paper ejecting rollers. (refer to flow charts in FIGS. 3–5)
2. Both side reading mode (R mode) . . . In the R mode, there are two kinds of modes as follows.
   2-1. (R1 mode) . . . In the mode, after a front surface of the document is read first, a back surface thereof is read by carrying out switchback, and thereafter the document is ejected. Namely, this is a front surface priority mode. (refer to FIGS. 6–8)
   2-2. (R2 mode) . . . In the mode, after the back surface of the document is read first, the front surface thereof is read by carrying out switchback, and thereafter the document is ejected. Namely, this is a back surface priority mode. (refer to flow charts in FIGS. 9–12)

Next, the operation is explained.

Figure 3:
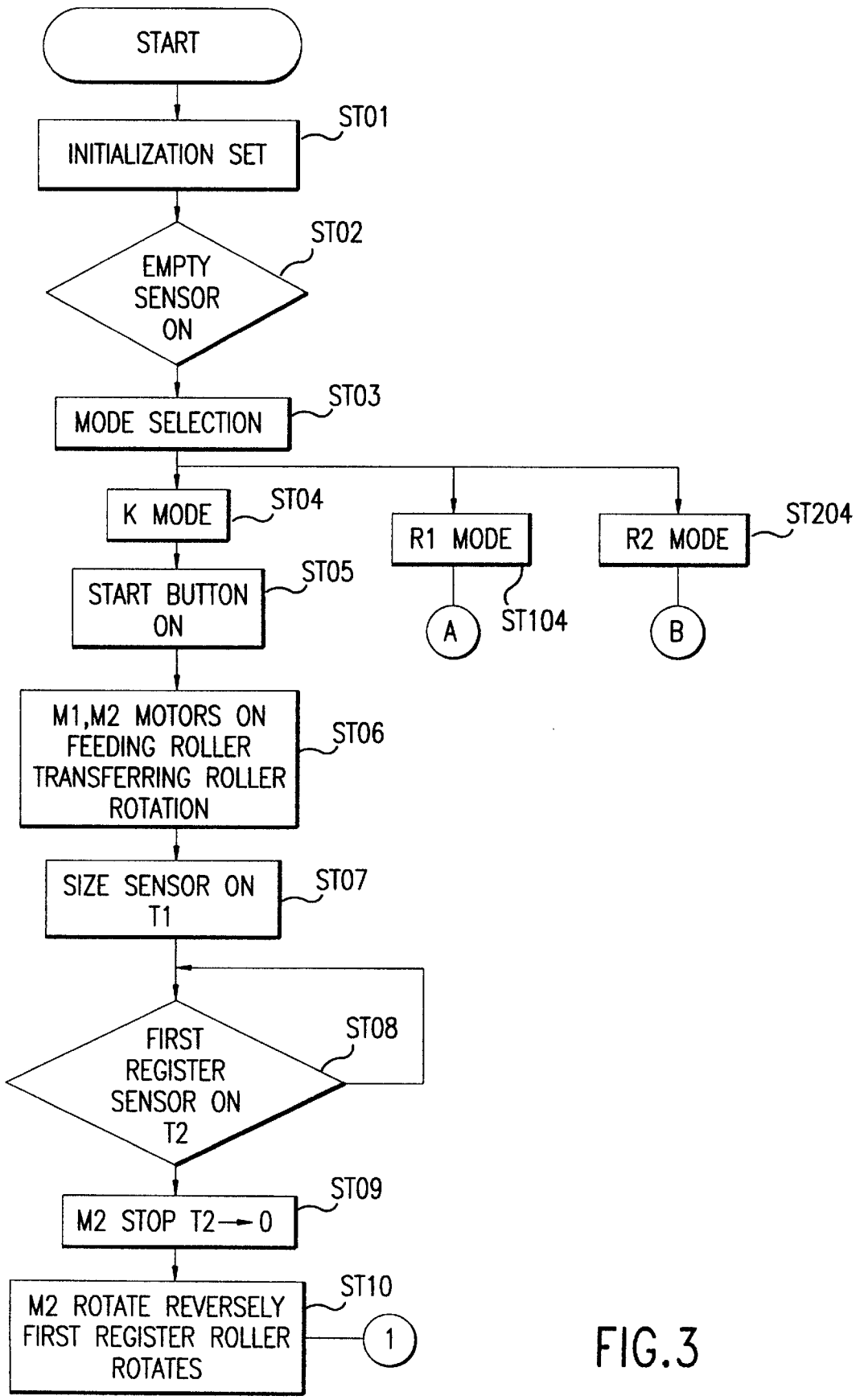
FIG. 3 is a flow chart 1 of a one side reading operation (K mode)
Figure 4:
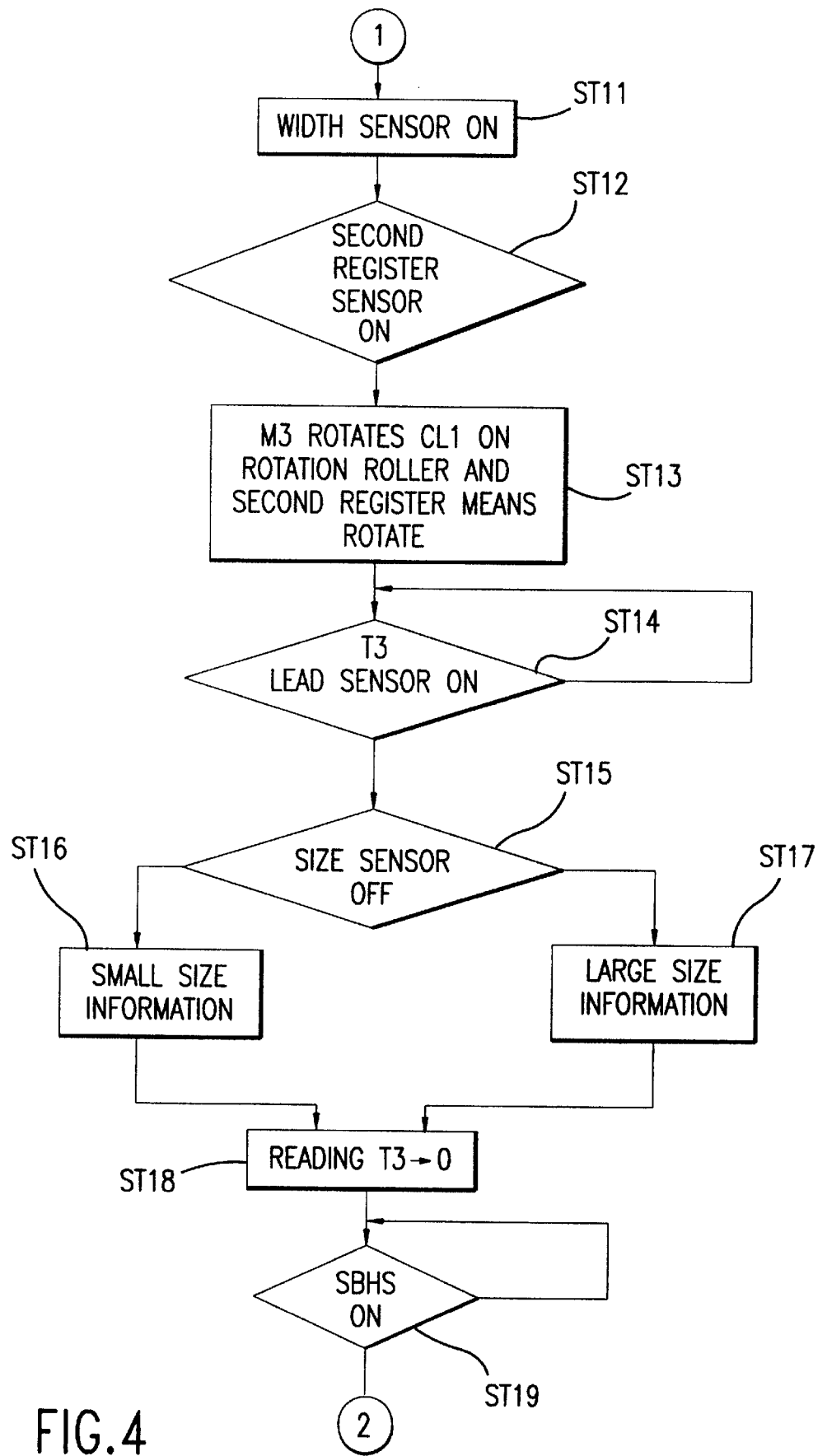
FIG. 4 is a flow chart 2 of the one side reading operation (K mode)
Figure 5:
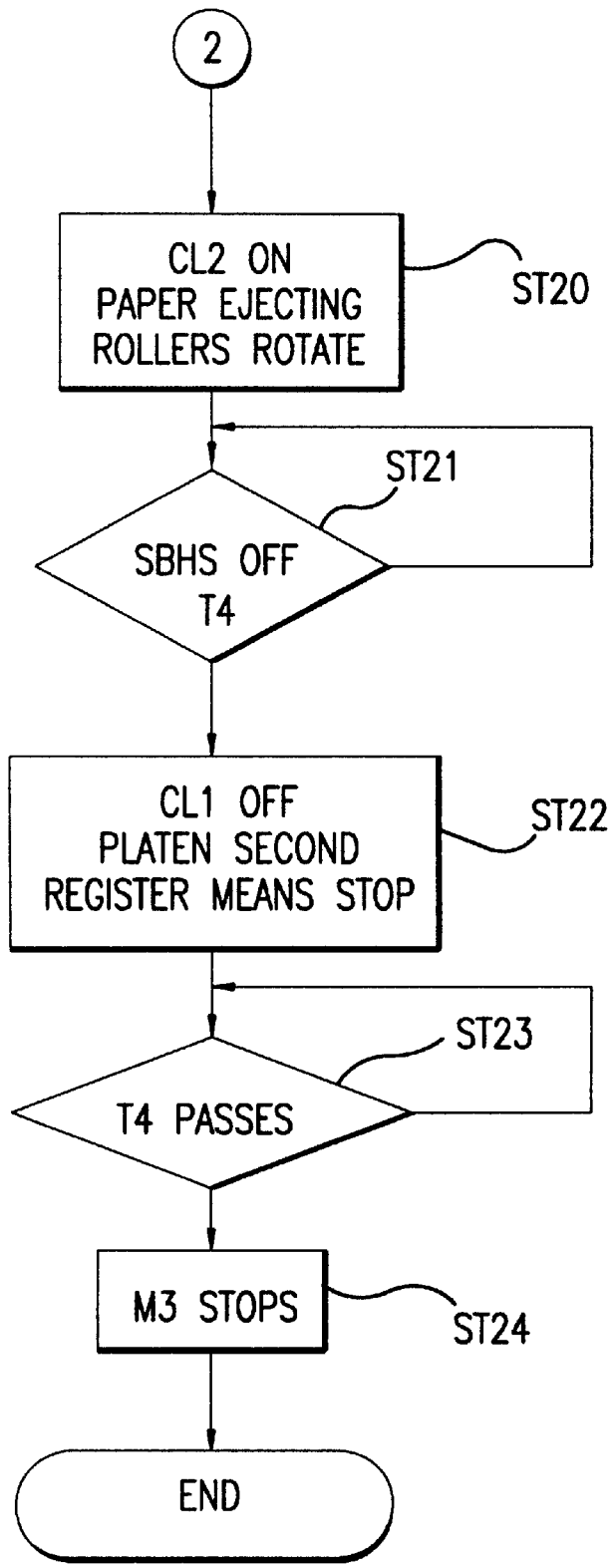
FIG. 5 is a flow chart 3 of the one side reading operation (K mode)

FIGS. 3–5 are the flow charts mainly concerning operations in the K mode (partly including common portions).

First of all, before a mode is selected, when the power is turned on and an automatic paper supply button is pushed, an initialization is established (ST01). The initialization includes an action where scanning means on the side of the main device 10 is moved to the reading position to be fixedly positioned. When the document is placed on the document tray 22, the empty sensor 38 is turned on (Step ST02).

Then, as shown in FIGS. 3–5, the paper supply mode is selected (ST03). The steps up to this step are common in the respective modes.

Now, in case the K mode (one side reading) is selected (ST04) and a start button is pushed, the motors M1, M2 start operating; the swing arm 31 descends as shown by a broken line in FIG. 1; the feeding roller 33 contacts the uppermost document to feed the same; and the document is transferred by the transferring roller 34 while being separated by the separation pad 35 into one sheet (ST05, ST06). Thereafter, the size sensor 45 detects a leading edge of the document, and a size timer T1 starts (ST07).

The separated and transferred document is soon detected by a first register sensor 47, and after a T2 time period, the DC motor M2 stops (ST08, ST09).

After a predetermined time period, the DC motor M2 starts rotating reversely (ST10); the first register means 43 rotates; a width size of the document in process in the main path 40 is obtained by the width sensor 46 (ST11); shortly thereafter, the document is detected by the second register sensor 58 (ST12); by a signal thereof, the pulse motor M3 starts rotating forward and the clutch CL1 is turned on simultaneously, so that the rotation roller 50 and the second register means 56 rotate (ST13).

The document is transferred along the transfer path 53 mainly by a transferring force of the second register means 56; the leading edge of the document is soon detected by the read sensor 61 (ST14); and before reading is started at a step (ST18), whether the size sensor 45 is turned on or off is verified (ST15). In case the size sensor 45 is turned off, information as a small sized document which is B5Y smaller is obtained (ST16); and when the size sensor 45 is turned on, information as a large size document which is larger than B5Y is obtained (ST17).

Incidentally, when the document even in the transfer path 53 reaches the guide 52B, with the help of the pinch roller 59, it is transferred by rotation of the rotation roller 50.

While being read, the document is transferred along the switching piece 75 disposed to over the rotation roller 50 to the guide 52C which also functions as the paper ejecting path. Then, the leading edge of the document is detected by the paper ejecting (switchback) sensor 62 (SBHS) (ST19); by a signal thereof, the clutch CL2 is turned on; and the pair 72 of the paper ejecting (switchback) rollers starts rotating in a forward direction (a document ejecting direction) (ST20). Shortly thereafter, the rear edge of the document passes through the SBHS sensor 62; when this sensor is turned off and the clutch CL1 is turned off, the rotation roller 50 and the second register means 56 stop; and the timer T4 starts simultaneously (ST21, ST22). Then, after a T4 time period, the pulse motor M3 stops, and the document is ejected to the ejection tray 80, so that reading of the first document is finished (ST23, ST24).

Figure 6:
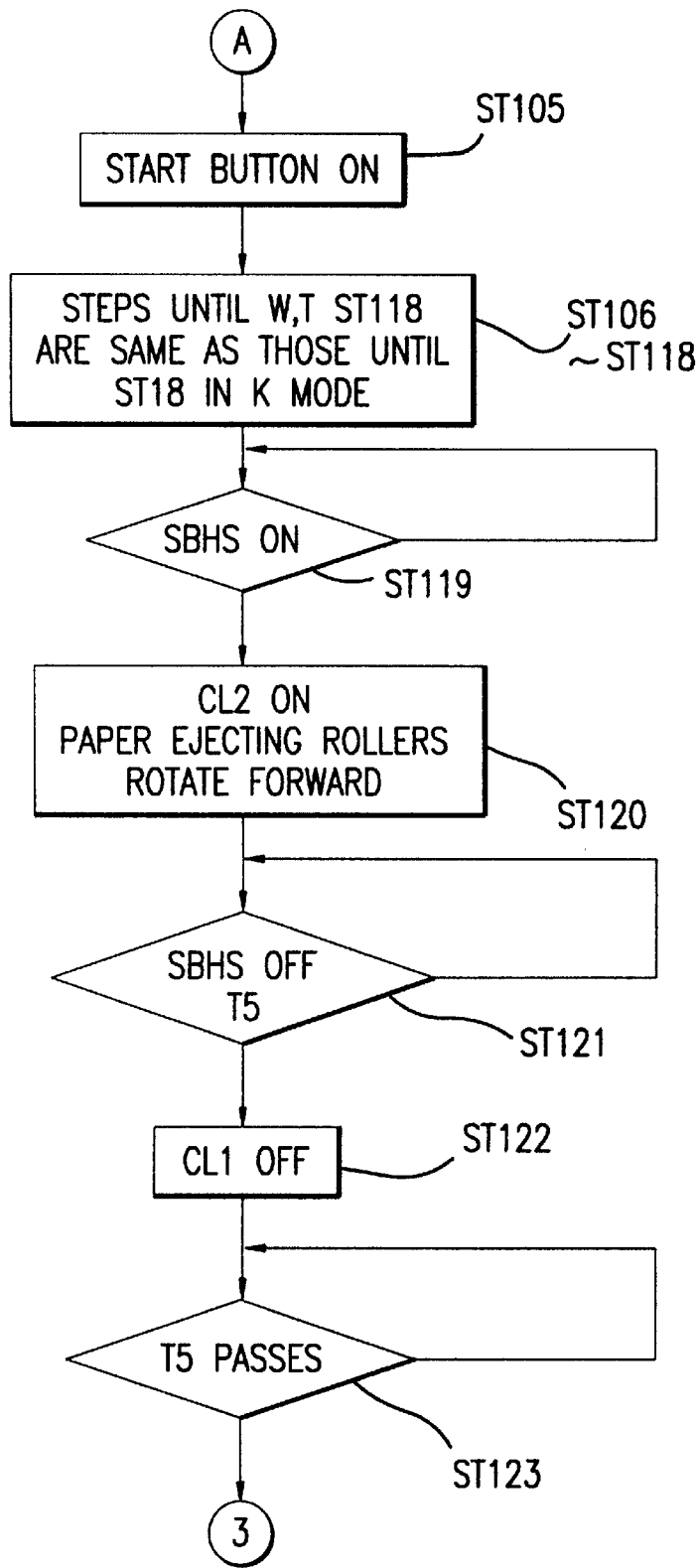
FIG. 6 is a flow chart 1 of a front side preferential operation in a two side reading (R1 mode)
Figure 7:
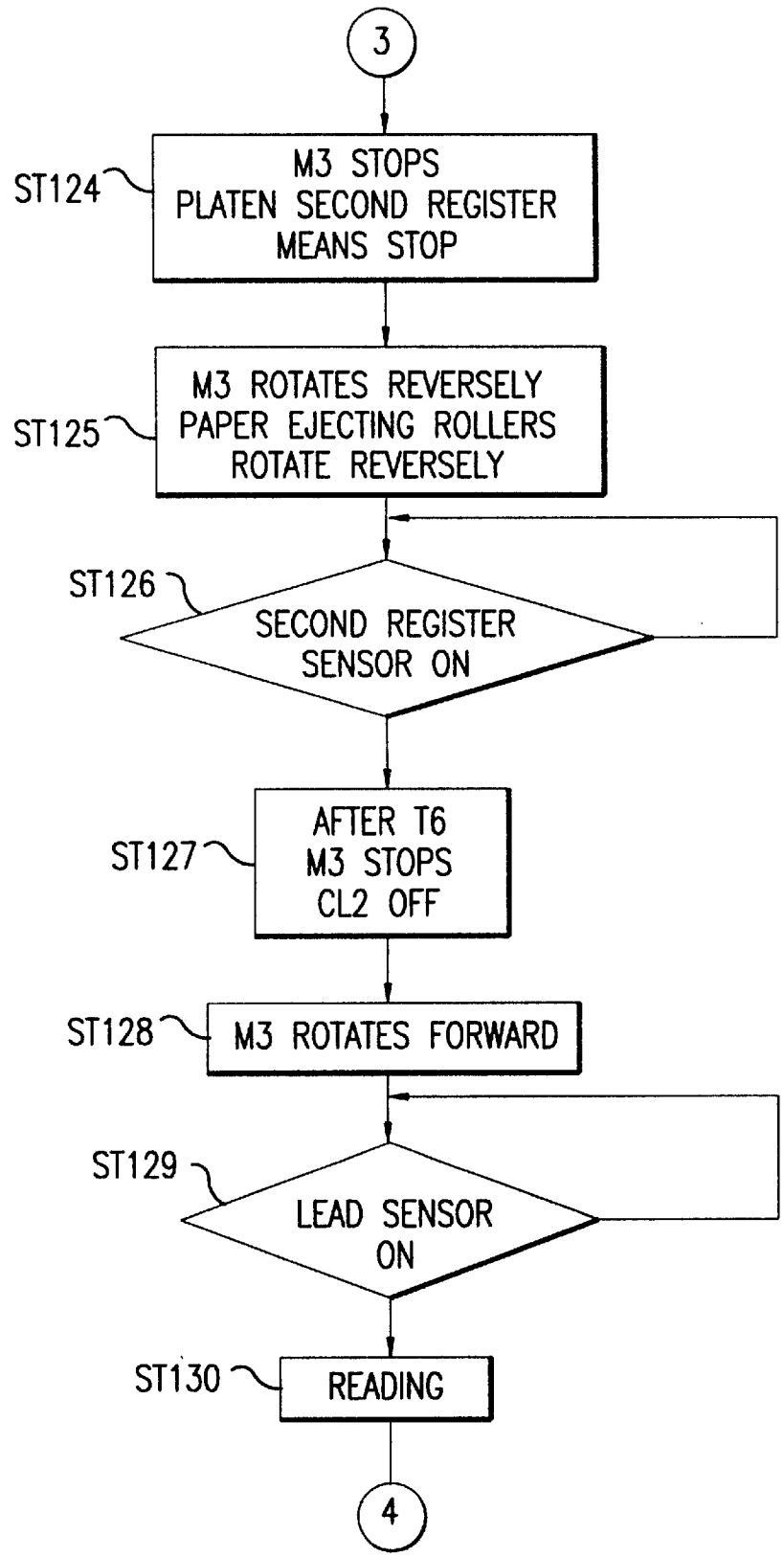
FIG. 7 is a flow chart 2 of the front side preferential operation in the two side reading (R1 mode)
Figure 8:
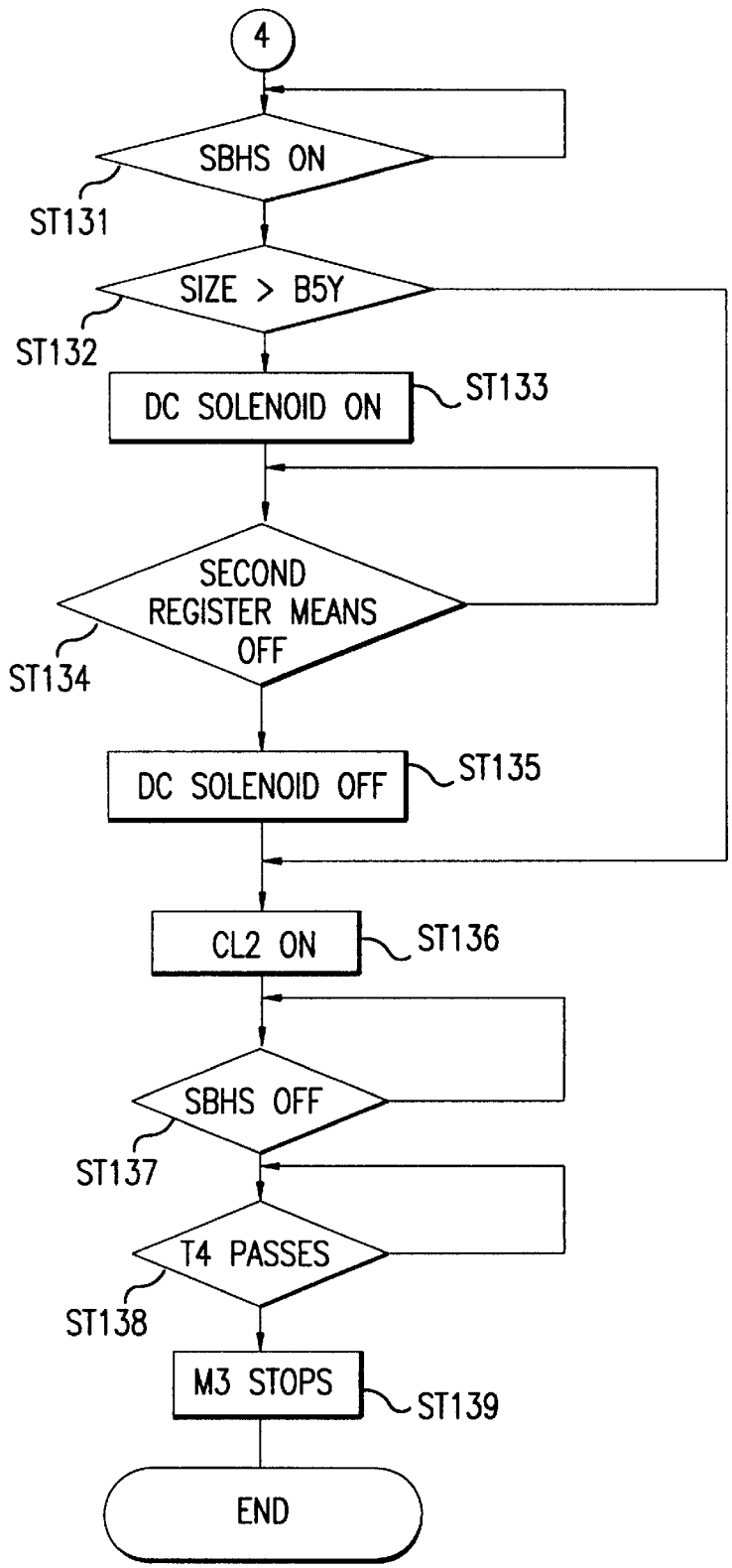
FIG. 8 is a flow chart 3 of the front side preferential operation in the two side reading (R1 mode)
Figure 9:
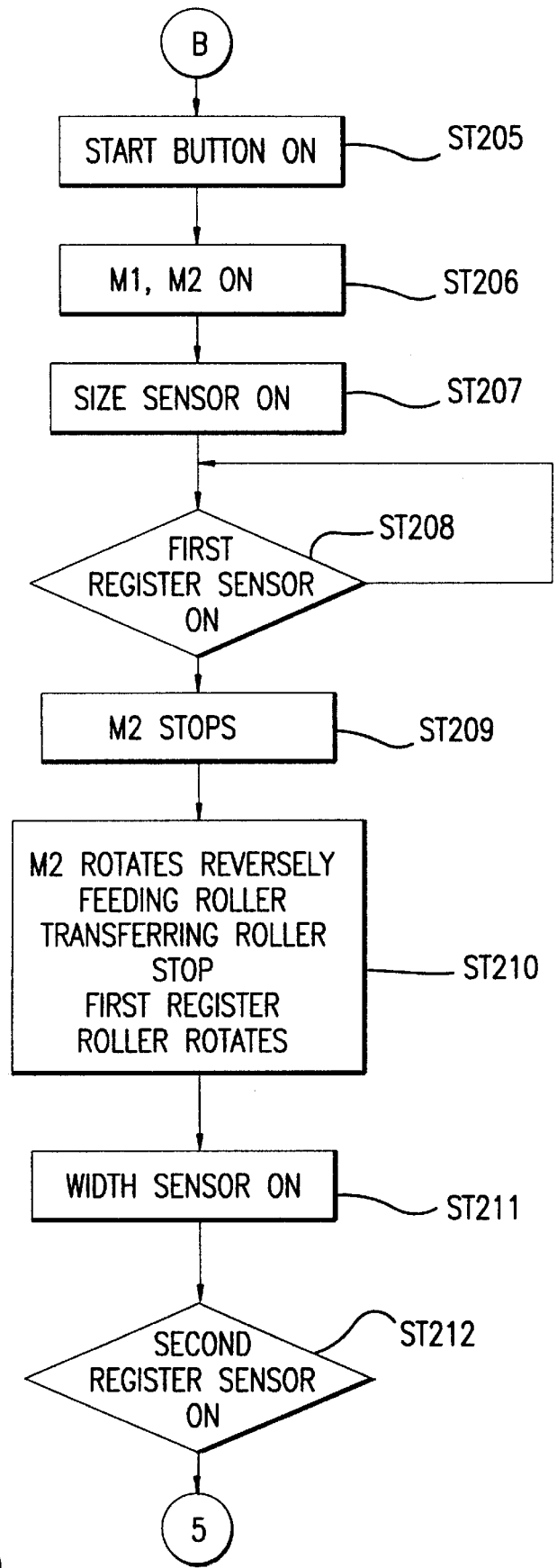
FIG. 9 is a flow chart 1 of a back side preferential operation in the two side reading (R2 mode)
Figure 10:
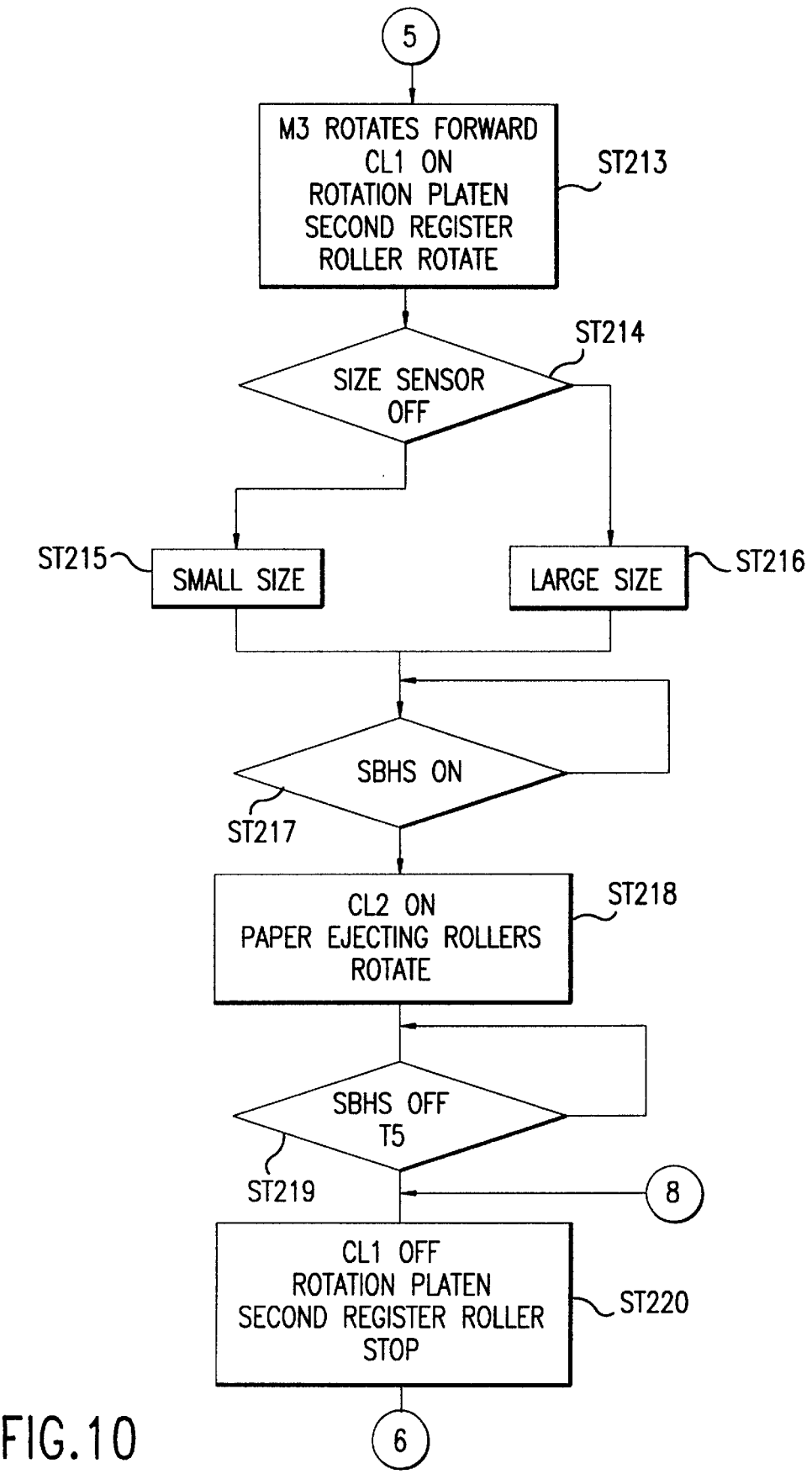
FIG. 10 is a flow chart 2 of the back side preferential operation in the two side reading (R2 mode)
Figure 11:
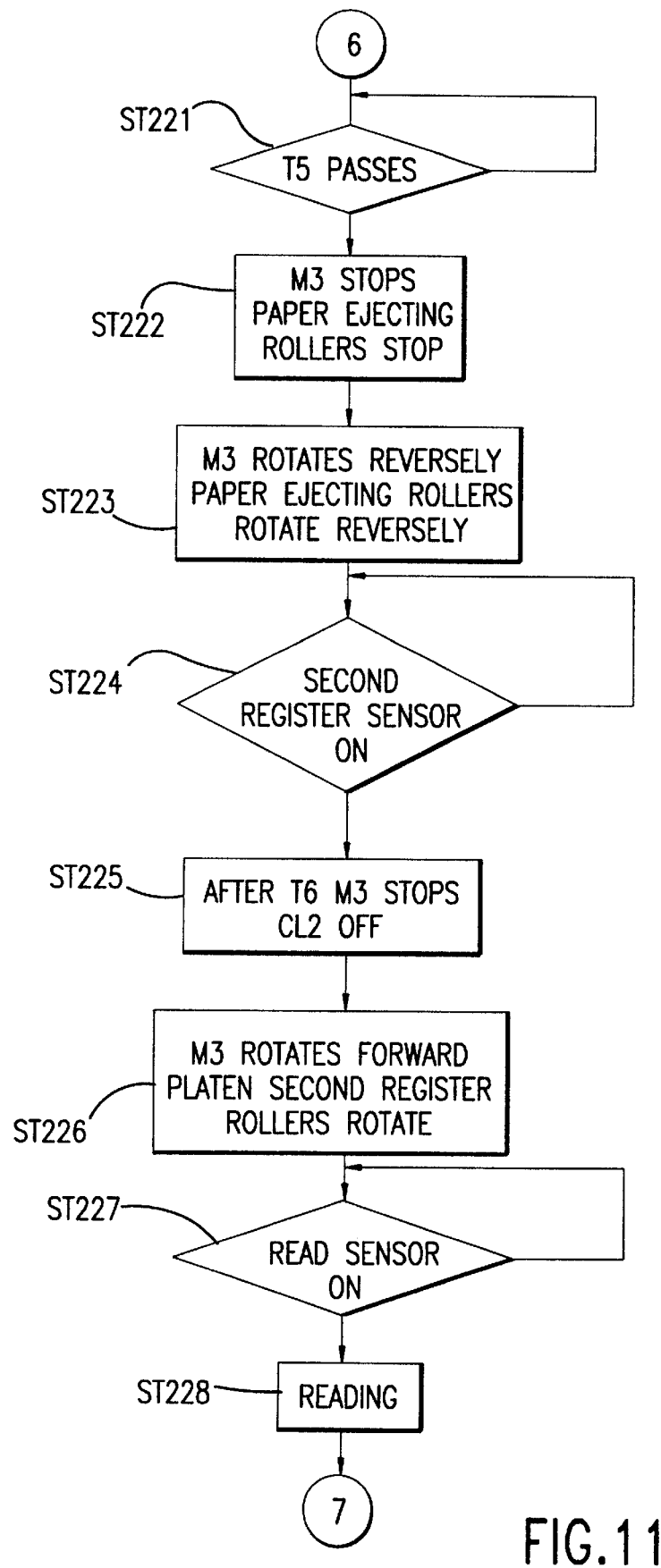
FIG. 11 is a flow chart 3 of the back side preferential operation in the two side reading (R2 mode)
Figure 12:
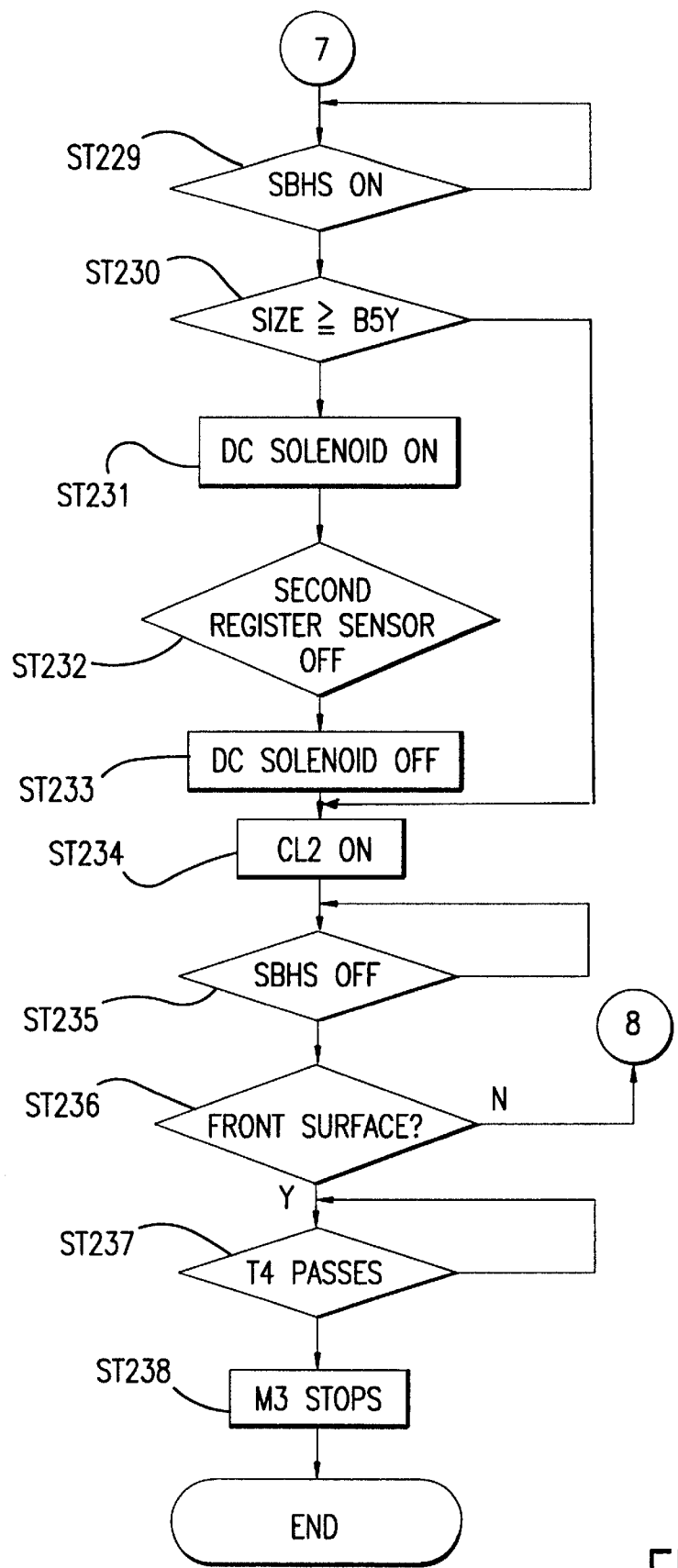
FIG. 12 is a flow chart 4 of the back side preferential operation in the two side reading (R2 mode)

Referring to FIGS. 6–8, an operation mode as an R1 mode (ST104) for preferentially reading the front surface of the document is explained.

It is the same as in the K mode in FIGS. 3–5 that after this mode is selected and the start button is pushed (ST105, ST106), the document is read (ST118), the leading and rear edges of the document are detected by the SBHS sensor, the clutch CL1 is turned off, and the rotation roller 50 and the second register means 56 stop (ST119–ST122). However, difference of both the modes is that at the step (ST121), the timer T4 in the former mode is the timer T5 in the latter mode. Namely, in the K mode, the document is ejected as it is; in contrast, in the R1 mode, it is necessary that the rear edge of the document is held by the pair 72 of the paper ejecting (switchback) rollers to set a timing for preparing the next switchback operation.

When the timer T5 is turned off, the pulse motor M3 once stops (ST123, ST124). At this time point, the rear edge of the document has passed at least the switching piece 75. Here, reading of the front surface side of the document is once finished.

Thereafter, the motor M3 starts rotating reversely this time, and the pair 72 of the paper ejecting (switchback) rollers makes the rear edge till now of the document be the leading edge, and transfers the document along the switchback path 71 (ST125). During this time period, since the clutch CL1 stays off, the rotation roller 50 and the second register means 56 stay still.

Shortly, the leading edge (the rear edge till now, the same applies hereinafter) of the document is detected by the second register sensor 58 (ST126); after some time T6, the motor M3 stops; and the clutch CL2 is turned off, so that after a posture of the document is corrected by the second register means 56, the document stands by (ST127).

After the predetermined timing, the clutch CL1 is turned on and the motor M3 starts operating, so that the document is transferred along the transfer path 53 (ST128). Steps (ST129–ST131) from a step where the lead sensor is turned on to the step where SBHS sensor is turned on, are the same as the steps (ST118–ST120), except for a difference where the back surface of the document is read in this case with respect to the front surface reading in the former case.

At this stage, the size information obtained before (ST116, ST117) is verified (ST132). Then, in case the document size is larger than B5Y, the DC solenoid 76 is energized; the roller 73 is separated from the roller 74; the pair 72 of the paper ejecting (switchback) rollers becomes a condition for receiving the leading and rear edges of the document simultaneously (ST133); by turning the second register means 56 off to detect the rear edge of the document, the solenoid 76 is turned off, and the clutch CL2 is turned on simultaneously (ST134–ST136), so that while being read, the document is transferred and ejected to the ejection tray 80 by the rotation roller 50 and the pair 72 of the paper ejecting (switchback) rollers (ST137–ST139).

On the other hand, in case the document size has a small size, the steps (ST133–ST135) are skipped to go to the step (ST136).

Next, referring to FIGS. 9–12, the operation in the R2 mode (ST204) (the back surface preferential mode) is explained.

Steps where after the start button is pushed, the size sensor 45 is turned off to obtain a size information, and the leading edge of the document is detected by the SBHS sensor (ST205–ST217), are almost the same as the steps (ST105) through (ST119) in the R1 mode, or the same as the steps (ST05) through (ST19) in the K mode as described above. The R2 mode is, however, different from the R1 mode in that it is not necessary to have the step (ST114) for turning the read sensor on and the step (ST118) for reading in the R1 mode. Namely, when the start button is pushed (ST205), the motors M1, M2 start (ST206); the document is transferred, and the size sensor 45 detects a leading edge of the document (ST207); the document is detected by the first register sensor (ST208) and the motor M2 stops (ST209); after a predetermined time period, the motor M2 rotates reversely, and the first register roller rotates (ST210); a width size of the document is obtained by the width sensor (ST211); then, the document is detected by the second register sensor (ST212); the motor M3 starts rotating, the clutch CL1 is turned on, and the second register roller rotates (ST213); and the document is transferred to the size sensor and the document size is obtained (ST214–ST216).

Steps after the leading edge of the document is detected by the SBHS sensor (ST217) are the same as those after the step (ST119). Namely, after the SBHS sensor is turned on (ST217), the clutch CL2 is turned on to rotate the paper ejecting rollers (ST218); the SBHS sensor is turned off (ST219), and the clutch CL1 is turned off (ST220); after time T5 has passed (ST221), the motor M3 stops (ST222); the motor M3 rotates reversely (switchback operation) (ST223); the leading edge of the document is detected by the second register sensor 58 (ST224); after time T6, the motor M3 stops, and the clutch CL2 is turned off (ST225), so that after a posture of the document is corrected by the second register means 56, the document stands by; then, the motor M3 rotates forward and the second register roller rotates to transfer the document (ST226); the read sensor 61 is turned on (ST227) and reading of the document is performed (ST228); the SBHS sensor is turned on (ST229); the size information is verfied (ST230), and if the document size is larger than B5Y, the steps (ST231–ST234) as in the steps (ST133–ST136) are taken; and then the SBHS sensor is turned off (ST235). When the operation reaches a step (ST236), since it is necessary to read the front surface of the document, the operation returns to a step (ST220) and the steps thereafter are repeated. After completion of the reading of the front and back surfaces of the document, the motor M3 stops to thereby finish the operation (ST237, ST238).

MODIFIED EXAMPLE

The present invention is not limited to the aforementioned embodiment, and, for example, the following structures are possible.

(1) A surface of the guide 52B is formed with white color, so as to enable to surely read an even thin document.

Figure 13A:
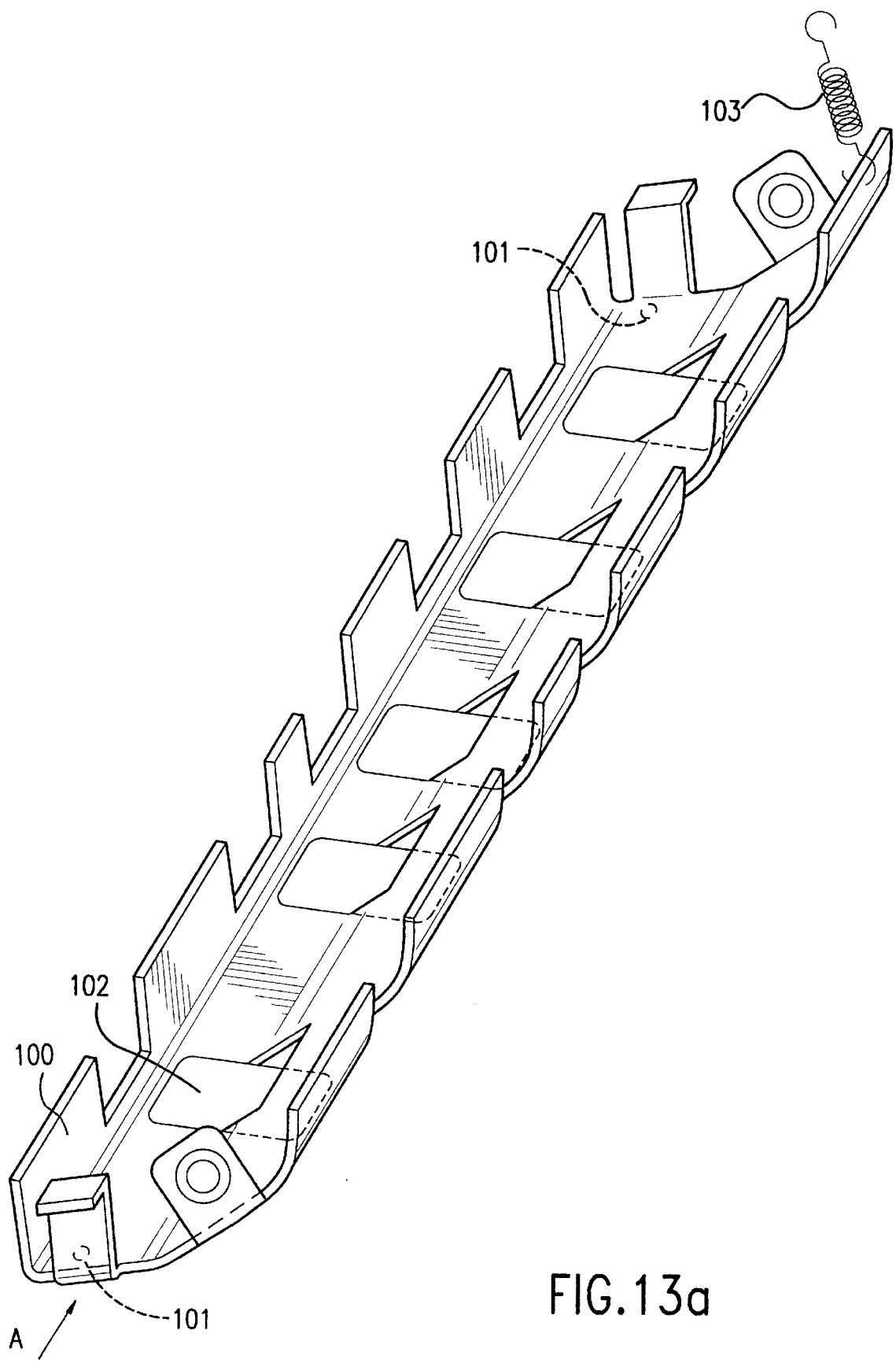
FIG. 13a is a side view of an essential part of a guide 52B.
Figure 13B:
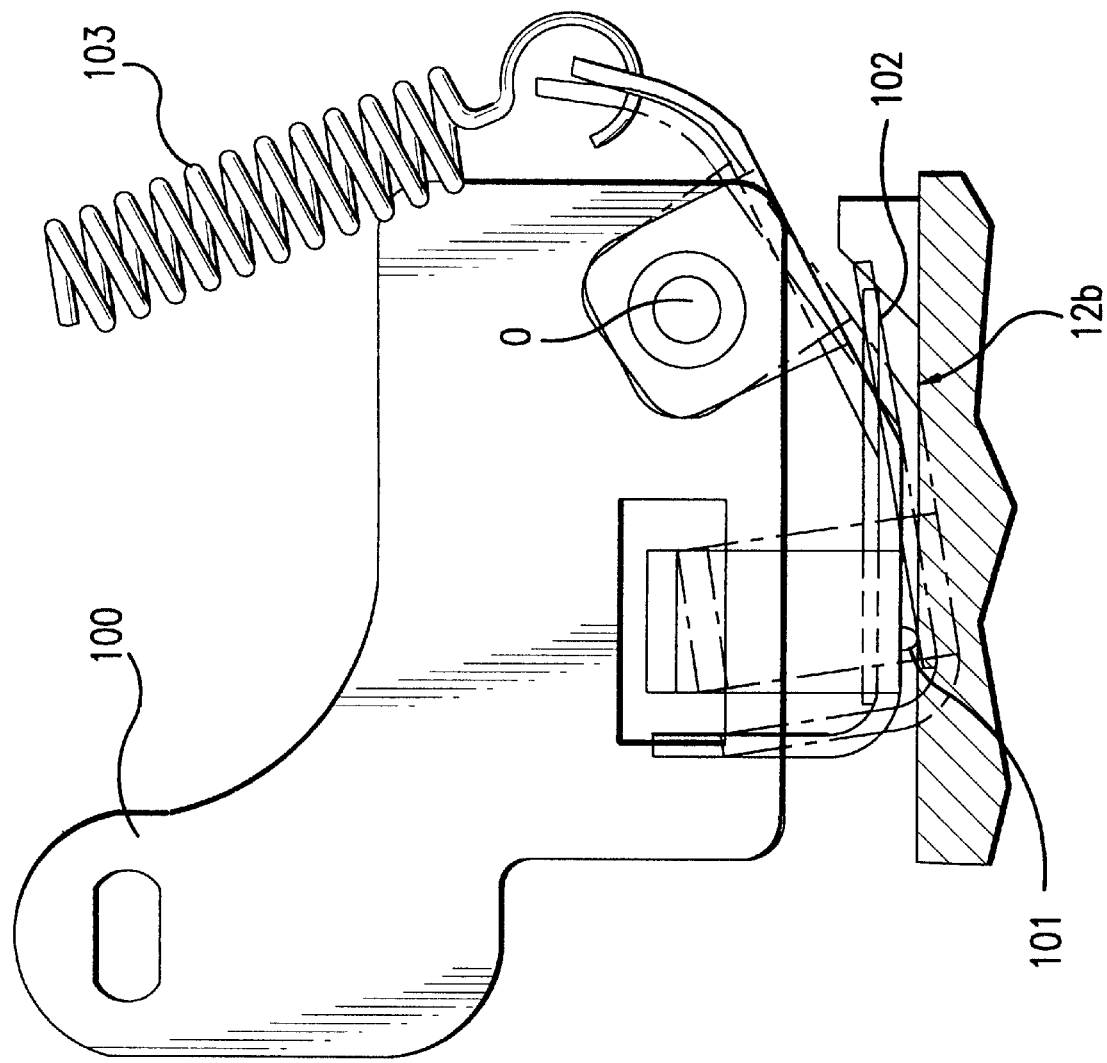
FIG. 13b is a perspective view of the essential part of the guide 52B.

(2) In a guide 100 similar to the guide 52B, as shown in FIGS. 13a, 13b, an attaching portion thereof is rotatably attached as a fulcrum O, and further a spring 103 for urging the guide 100 toward the platen 12b side is disposed at an edge of a side opposite to a reading portion side over the fulcrum O, so that projections 101 formed at both end portions of the guide 100 abut against the platen 12b with always a predetermined distance between the platen 12b and the guide 100.

(3) In a downstream side of the reading position of the guide 100, Mylars 102 projecting toward a side facing the guide 100 are disposed, and the Mylars 102 urge the transferring document to be held between the transferring guides, so that vibration caused when the rear edge of the document passes the roller 59 is reduced to thus enable to definitely read an image.

Figure 14:
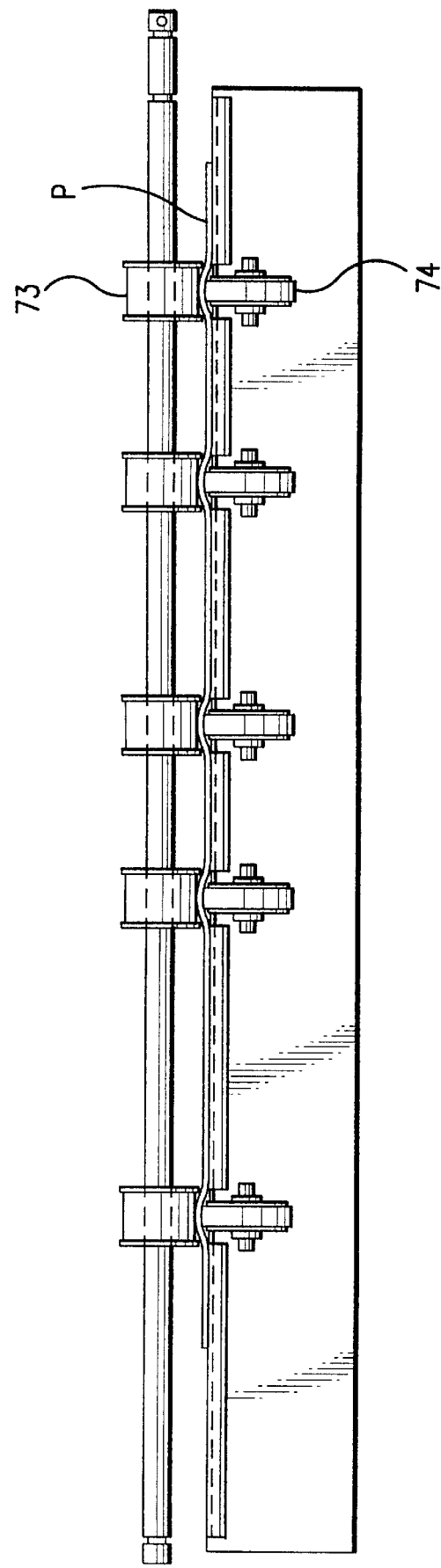
FIG. 14 is a structural view of an essential part of a pair 72 of switchback rollers.

(4) The pair 72 of the switchback rollers is, as shown in FIG. 14, structured such that the roller 74 is disposed to be inserted into a concave portion of the roller 73 having a convex and concave peripheral surface; and further the ejection tray 80 is formed such that a sloping portion is provided between a forward edge portion and a rear edge portion in a paper ejecting direction, and the sloping portion is formed to ascend gradually from the rear edge portion to the forward edge portion, so that the document is transferred on the ejection tray without dropping downward, the rear edge of the document P is prevented from remaining when the document is ejected, and at the same time the document can be certainly transferred at the time of switchback.

(5) For an image forming device capable of setting a copy ratio, while the document is read, a document transferring speed may be set at a speed corresponding to a reading ratio, and except for the period for reading the document, the transferring speed may be shifted to the highest speed.

Figure 15:
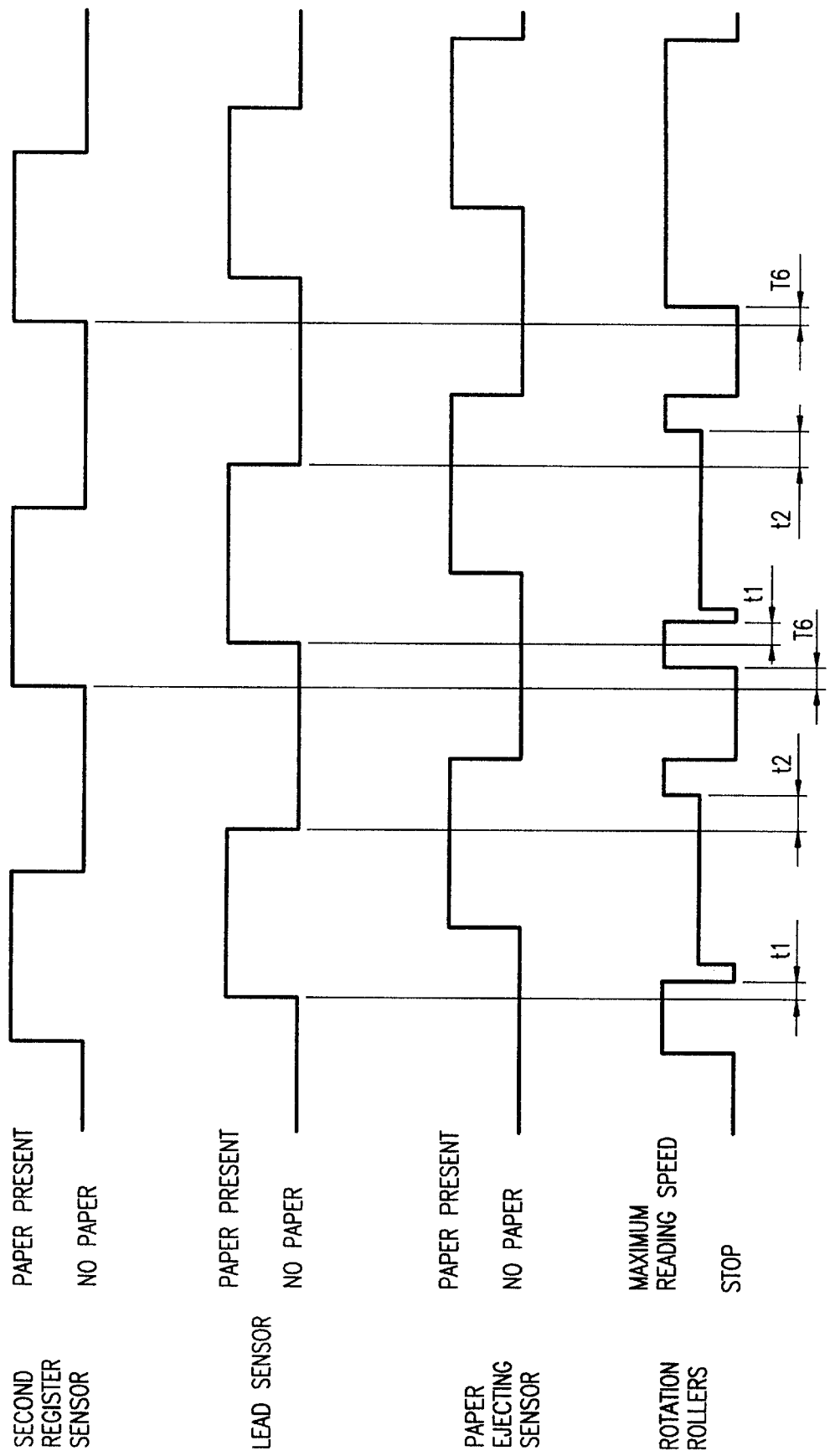
FIG. 15 is a timing chart of a rotation roller 50 in both side processing when a document circulates through a transfer path three times.
Figure 16:
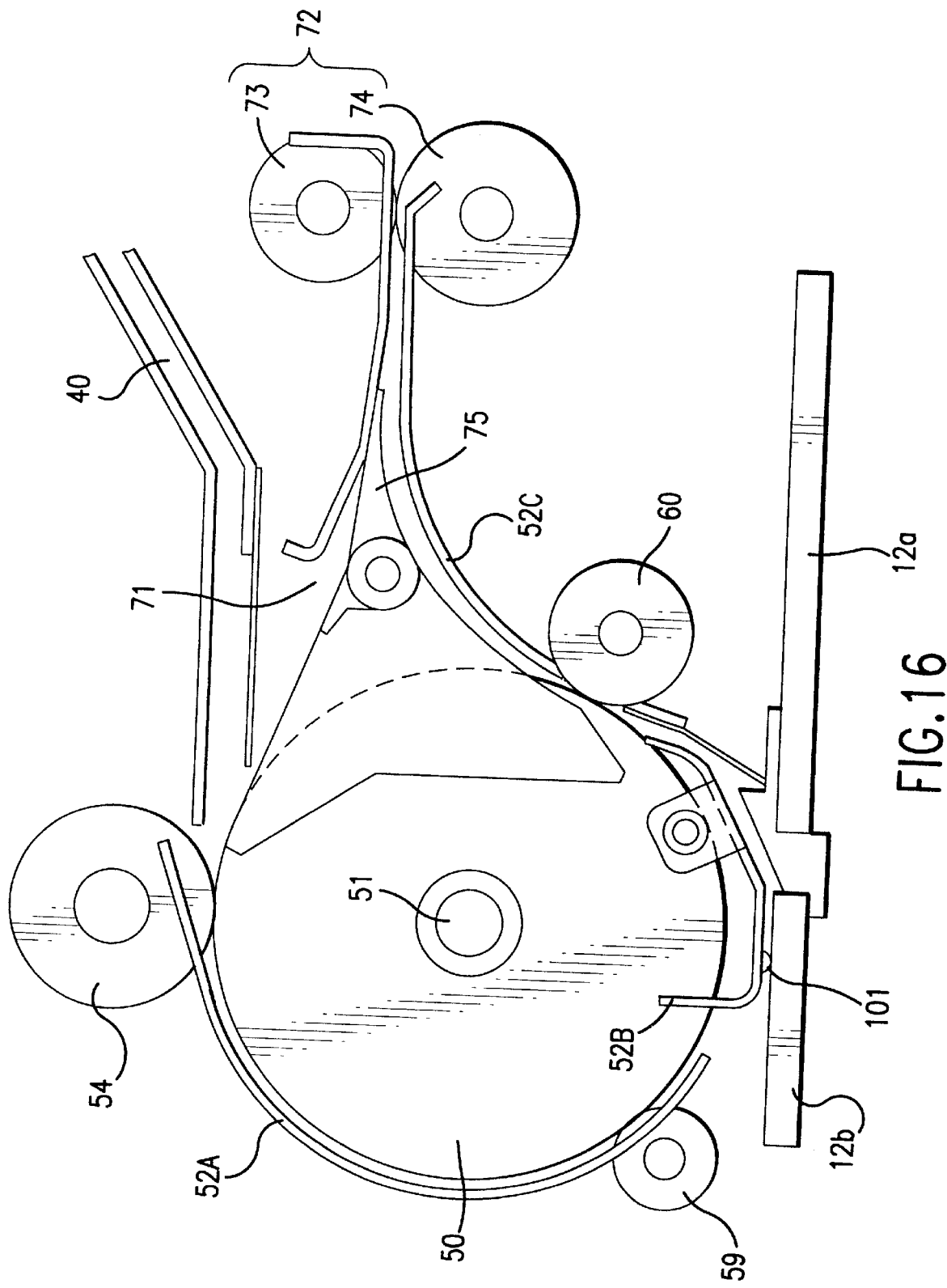
FIG. 16 is a side view of an essential part of a transferring portion.

An operation of the rotation roller 50 at this time is explained referring to a timing chart in FIG. 15 wherein the document has been circulated three times.

When the document fed from the document tray is transferred at a high speed and a leading edge of the document is detected by the second register sensor, the rotation roller 50 starts rotating at a high speed (305 m/s) to transfer the document supplied in the transfer path at the high speed. After t1 since the leading edge of the document supplied in the transfer path is detected by the read sensor 61, the rotation roller is stopped once and started again corresponding to a reading timing of the reading means. At this time, the transferring speed is a speed corresponding to the copy ratio, for example, 283 m/s when the copy ratio is 48%, 136 m/s when the copy ratio is 100%, and 34 m/s when the copy ratio is 400%. Further, after t2 since the rear edge of the reading document is detected by the read sensor 61, the transferring speed is shifted from the speed corresponding to the copy ratio to the high speed to thereby transfer the document to a paper ejecting port at the high speed. In this way, when the first round of transferring is completed, the document is transferred through the switchback path to an inlet portion of the transfer path again. After T6 since the leading edge of the document transferred to the inlet portion reaches the second register sensor, the rotation roller 50 starts rotation and operates as in the first round; at the third round, since the document is not read when the document is transferred through the transfer path, the document is transferred to the paper ejecting port at the high speed without shifting the transferring speed; and when the rear edge of the document is detected by the SBHS sensor, the rotation roller 50 is stopped.

The transferring speed corresponding to the copy ratio and the transferring speed except for a time while the document is read, are as follows.

The highest speed of the motor~305 m/s (=the transferring speed except for a time while the document is read.)

Copy ratio 48% (minimum reduction ratio)~283 m/s

100% (size to size)~136 m/s

400% (maximum enlargement ratio)~34 m/s (6) In case a both-side document is processed, while the document received in the transfer path 53 is ejected to the ejection tray 80, the next document may be transferred to a stand-by position in the main path 40 (so-called pre-feeding of the next document). At this time, the pre-feeding operation of the next document includes steps such that while the former document is transferred in the transfer path 53, the next document is fed from the paper supplying portion 30; a posture thereof is adjusted by the pair 43 of the register rollers; a transferring amount preliminary set at the pair 43 of the register rollers is transferred; and the document is stopped to stand by at the stand-by position in the main path 40. Then, when the rear edge of the former document at the final round is detected by the read sensor 61, the next document standing by at the stand-by position is supplied toward the transfer path.

As described above, by pre-feeding the next document, the documents are effectively transferred to thereby reduce time for exchanging documents.

According to the present invention, the following effects can be expected.

(1) In a limited space between the document pressing means and the document placing means, there is provided the switchback path for guiding the document ejected from the transfer path to a back side of the document pressing means toward the inlet side of the transfer path by the switchback transfer, so that various kinds of document transfer to the transfer path, such as a front surface transfer and a back surface transfer, become available although the structure is compact.

(2) Since a back surface of the document pressing means constitutes a part of the switchback path, the structure can be further simplified and made compact.

(3) Even if a structure is so compact that a reading edge of the document reversely transferred from the switchback path is returned to the pair of the switchback rollers through the transfer path to thereby adjoin the rear portion of the document at the pair of the switchback rollers, the reading edge and the rear portion of the document are prevented from being rubbed each other by the roller separating means.

(4) Since the pair of the switchback rollers is also used as the paper ejecting means, the structure is further simplified and can be manufactured at a low cost.

(5) On a downstream side of a junction between the transfer path and the switchback path, the register means for causing alignment of the document and setting a transfer timing is disposed, so that the timing for feeding the document can be accurate, and the transferring posture can be held excellently.

(6) Since the transferring means is formed of the wheel shape member with a large diameter, in the transfer path, the transfer speed can be always maintained uniformly, stable document transfer can be obtained, and the document can be read certainly.

What is claimed is:

1. A document feeder comprising:

a reading section for reading an original document while the original document is being transferred;

a document tray for mounting the original document and supplying the original document to the reading section;

an ejecting tray for receiving the original document after being read at the reading section;

a transfer roller located near the reading section, said transfer roller having a first transfer path therearound, an inlet and an exit so that the original document is transferred from the inlet to the exit through the reading section;

first and second rollers pressed against the transfer roller, said first and second rollers being located respectively in upstream and down stream sides of the first transfer path relative to the reading section;

a guide member having one end at least overlapped with the transfer roller and the other end so that the original document from the second roller is guided from the one end to the other end; and a second transfer path situated at the other end of the guide member.

2. A document feeder according to claim 1, wherein said second transfer path is an ejecting path for reading the original document transferred from the other end of the guide member to the ejecting tray.

3. A document feeder according to claim 1, wherein said second transfer path is a switchback path for reversing a transfer direction of the original document transferred from the other end of the guide member and leading to the inlet again.

4. A document feeder according to claim 3, wherein said guide member also defines a path so that the original document where the transfer direction is reversed is guided to the inlet.

5. A document feeder according to claim 3, wherein said guide member guides a leading edge of the original document transferred from the switchback path to an ejecting path through the first transfer path.

* * * * *